(12) United States Patent
Lan et al.

(10) Patent No.: US 11,003,949 B2
(45) Date of Patent: May 11, 2021

(54) NEURAL NETWORK-BASED ACTION DETECTION

(71) Applicant: MICROSOFT TECHNOLOGY LICENSING, LLC, Redmond, WA (US)

(72) Inventors: Cuiling Lan, Redmond, WA (US); Wenjun Zeng, Redmond, WA (US); Sijie Song, Redmond, WA (US); Junliang Xing, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 171 days.

(21) Appl. No.: 16/348,420

(22) PCT Filed: Oct. 31, 2017

(86) PCT No.: PCT/US2017/059139
§ 371 (c)(1),
(2) Date: May 8, 2019

(87) PCT Pub. No.: WO2018/089221
PCT Pub. Date: May 17, 2018

(65) Prior Publication Data
US 2020/0074227 A1  Mar. 5, 2020

(30) Foreign Application Priority Data
Nov. 9, 2016  (CN) .......................... 201610987537.0

(51) Int. Cl.
*G06K 9/62* (2006.01)
*G06K 9/00* (2006.01)
(Continued)

(52) U.S. Cl.
CPC ....... *G06K 9/6256* (2013.01); *G06K 9/00342* (2013.01); *G06K 9/00718* (2013.01); *G06N 3/0445* (2013.01); *G06N 3/08* (2013.01)

(58) Field of Classification Search
CPC ............. G06K 9/6256; G06K 9/00342; G06K 9/00718; G06K 2009/00738;
(Continued)

(56) References Cited

U.S. PATENT DOCUMENTS 10,019,629 B2 * 7/2018 Lan ...................... G06N 3/0454
2014/0169623 A1   6/2014 Liu et al.

FOREIGN PATENT DOCUMENTS

CN       104700828 A     6/2015
WO       2016145379 A1   9/2016

OTHER PUBLICATIONS

Ba, et al., "Multiple Object Recognition with Visual Attention", In Repository of arXiv:1409.0473v1, Dec. 24, 2014, pp. 1-10.
(Continued)

*Primary Examiner* — Charlotte M Baker
(74) *Attorney, Agent, or Firm* — Merchant & Gould P.C.

(57) ABSTRACT

Various implementations of the subject matter described herein relate to a neural network-based action detection. There is provided an action detection scheme using a neural network. The action detection scheme can design and optimize the neural network model based on respective importance of different frames such that frames that are more important or discriminative for action recognition tend to be assigned with higher weights and frames that are less important or discriminative for action recognition tend to be assigned with lower weights.

15 Claims, 8 Drawing Sheets

(51) Int. Cl.
*G06N 3/04* (2006.01)
*G06N 3/08* (2006.01)

(58) Field of Classification Search
CPC ............ G06K 9/4671; G06K 9/00744; G06K 9/00335; G06N 3/0445; G06N 3/08; G06N 3/084
USPC ........................................................ 382/157
See application file for complete search history.

(56) References Cited

OTHER PUBLICATIONS

Bahdanau, et al., "Neural Machine Translation by Jointly Learning to Align and Translate", In Journal of Computing Research Repository, Sep. 1, 2014, pp. 1-15.

Bazzani, et al., "Recurrent Mixture Density Network for Spatiotemporal Visual Attention", In Journal of Computer Research Repository, Mar. 27, 2016, pp. 1-16.

Carlsson, et al., "Action Recognition by Shape Matching to Key Frames", In Proceedings of the Workshop on Models versus Exemplars in Computer Vision, vol. 1, Issue 18, Dec. 1, 2001, pp. 1-8.

Du, et al., "Hierarchical Recurrent Neural Network for Skeleton based Action Recognition", In Proceedings of the IEEE Conference on Computer Vision and Pattern Recognition, Jun. 7, 2015, pp. 1110-1118.

Fragkiadaki, et al., "Recurrent Network Models for Human Dynamics", In Proceedings of the IEEE International Conference on Computer Vision, Dec. 7, 2015, pp. 4346-4354.

Gan, et al., "DevNet: A Deep Event Network for multimedia event detection and evidence recounting", In Proceedings of the IEEE Conference on Computer Vision and Pattern Recognition, Jun. 7, 2015, pp. 2568-2577.

Goferman, et al., "Context-Aware Saliency Detection", In Journal of IEEE Transactions on Pattern Analysis and Machine Intelligence, vol. 34, Issue 10, Oct. 2012, pp. 1-8.

Golik, et al., "Cross-Entropy vs. Squared Error Training: a Theoretical and Experimental Comparison", In Proceedings of the 14th Annual Conference of the International Speech Communication Association, Aug. 25, 2013, pp. 1756-1760.

Graves, Alex, "Supervised Sequence Labelling with Recurrent Neural Networks", In Publication of Springer, Jan. 2012, 137 Pages.

Han, et al., "Space-Time Representation of People Based on 3D Skeletal Data: A Review", In Journal of Computer Vision and Image Understanding, vol. 158, Jan. 5, 2016, pp. 1-21.

Hochreiter, et al., "Gradient Flow in Recurrent Nets: The Difficulty of Learning Long-Term Dependencies", In Book of "A Field Guide to Dynamical Recurrent Networks", Published by John Wiley and Sons, Jan. 15, 2001, pp. 1-15.

Hochreiter, et al., "Long Short-Term Memory", In the Journal of Neural Computation, vol. 9, Issue 8, Nov. 15, 1997, pp. 1-32.

Hu, et al., "Jointly Learning Heterogeneous Features for RGB-D Activity Recognition", In Proceedings of the IEEE Conference on Computer Vision and Pattern Recognition, Jun. 7, 2015, pp. 5344-5352.

Ji, et al., "Interactive Body Part Contrast Mining for Human Interaction Recognition", In Proceedings of the IEEE International Conference on Multimedia and Expo Workshops, Jul. 14, 2014, 6 Pages.

Jiang, et al., "Saliency in Crowd", In Proceedings of the 13th European Conference on Computer Vision, Sep. 6, 2014, pp. 17-32.

Johansson, Gunnar, "Visual Perception of Biological Motion and a Model for its Analysis", In Journal of Perception and Psychophysics, vol. 14, No. 2, Jun. 1, 1973, pp. 201-211.

Karpathy, et al., "Visualizing and understanding recurrent networks", In Journal of Computing research repository, Jun. 5, 2015, pp. 1-13.

Kingma, et al., "Adam: A Method for Stochastic Optimization", In Journal of the Computing Research Repository, Dec. 22, 2014, pp. 1-9.

Li, et al. "Online Human Action Detection Using Joint Classification-Regression Recurrent Neural Network", In Journal of Computer Research Repository, Apr. 19, 2016, pp. 1-20.

Liu, et al., "Boosted key-frame selection and correlated pyramidal motion-feature representation for human action recognition", In Journal of Pattern Recognition, vol. 46, Issue 7, Jul. 1, 2013, pp. 1810-1818.

Liu, "Spatio-Temporal LSTM with Trust Gates for 3D Human Action Recognition", In Proceedings of 14th European Conference on Computer Vision, Oct. 11, 2016, pp. 1-18.

Mahasseni, et al., "Regularizing Long Short Term Memory with 3D Human-Skeleton Sequences for Action Recognition", In Proceedings of the 29th IEEE Conference on Computer Vision and Pattern Recognition, Jun. 27, 2016, pp. 3054-3062.

"International Search Report and Written Opinion Issued in PCT Application No. PCT/US2017/059139", dated Feb. 15, 2018, 13 Pages.

Piergiovanni, et al., "Temporal attention filters for human activity recognition in videos", In Repository of arXiv: 1605.08140v1, May 26, 2016, pp. 1-9.

Poppe, Ronald, "A Survey on Vision-Based Human Action Recognition", In Journal of Image and Vision Computing, vol. 28, Issue 6, Jun. 1, 2010, pp. 976-990.

Ramanathan, et al., "Detecting Events and Key Actors in Multi-Person Videos", In Journal of Computer Research Repository, Nov. 9, 2015, pp. 1-11.

Raptis, et al., "Poselet Key-Framing: A model for human activity recognition", In Proceedings of the IEEE Conference on Computer Vision and Pattern Recognition, Jun. 23, 2013, pp. 2650-2657.

Salehinejad, Hojjat, "Learning Over Long Time Lags", In Journal of Computer Research Repository, Feb. 13, 2016, pp. 1-16.

Shahroudy, et al., "NTU RGB+ D: A Large Scale Dataset for 3D Human Activity Analysis", In Journal of Computer Research Repository, Apr. 11, 2016, pp. 1-10.

Sharma, et al., "Action Recognition using Visual Attention", In Journal of Computing Research Repository, Nov. 12, 2015, pp. 1-11.

Shotion, et al., "Real-time Human Pose Recognition in Parts from a Single Depth Image", In Proceedings of the IEEE Conference on Computer Vision and Pattern Recognition, Jun. 20, 2011, pp. 1-8.

Simonyan, et al., "Two-Stream Convolutional Networks for Action Recognition in Videos", In Proceedings of the Annual Conference on Neural Information Processing Systems, Dec. 8, 2014, 9 Pages.

Singh, et al., "A Multi-Stream Bi-Directional Recurrent Neural Network for Fine-Grained Action Detection", In Proceedings of the 29th IEEE Conference on Computer Vision and Pattern Recognition, Jun. 27, 2016, pp. 1961-1970.

Sminchisescu, "Conditional Models for Contextual Human Motion Recognition", In Journal of Computer Vision and Image Understanding, vol. 104, Issue 2, Nov. 1, 2006, pp. 210-220.

Song, et al., "An End-to-End Spatia-Temporal Attention Model for Human Action Recognition from Skeleton Data", In Repository of arXiv:1611.06067, Nov. 18, 2016, 7 Pages.

Veeriah, et al., "Differential Recurrent Neural Networks for Action Recognition", In Journal of Computer Research Repository, Apr. 25, 2015, pp. 1-9.

Vemulapalli, et al., "R3DG Features: Relative 3D Geometry-based Skeletal Representations for Human Action Recognition", In Journal of Computer Vision and Image Understanding, vol. 152, Nov. 1, 2016, 34 Pages.

Wang, et al., "Mining Actionlet Ensemble for Action Recognition with Depth Cameras", In Proceedings of the IEEE Conference on Computer Vision and Pattern Recognition, Jun. 16, 2012, pp. 1290-1297.

Wang, et al., "Sequentially Supervised Long Short-Term Memory for Gesture Recognition", In Publication of Springer, vol. 8, Issue 5, Oct. 1, 2016, pp. 982-991.

(56) References Cited

OTHER PUBLICATIONS

Weinland, et al., "A Survey of Vision-Based Methods for Action Representation, Segmentation and Recognition", In Proceedings of Computer vision and image understanding, vol. 115, No. 2, Feb. 24, 2010, 58 Pages.
Wu, et al., "Action Recognition with Joint Attention on Multi-Level Deep Features", In Journal of Computer Research Repository, Jul. 9, 2016, 13 Pages.
Wu, et al., "Modeling Spatial-Temporal Clues in a Hybrid Deep Learning Framework for Video Classification", In the Proceedings of the 23rd ACM International Conference on Multimedia, Oct. 26, 2015, pp. 461-470.
Xia, et al., "View Invariant Human Action Recognition using Histograms of 3D Joints", In Proceedings of the IEEE Computer Society Conference on Computer Vision and Pattern Recognition Workshops, Jun. 16, 2012, 8 Pages.
Xu, et al., "Show, Attend and Tell: Neural Image Caption Generation with Visual Attention", In Proceedings of the 32nd International Conference on Machine Learning, Jul. 6, 2015, 10 Pages.
Yeung, et al., "Every Moment Counts: Dense Detailed Labeling of Actions in Complex Videos", In Journal of Computer Research Repository, Jul. 21, 2015, pp. 1-10.
Yu, et al., "An Object-Based Visual Attention Model for Robotic Applications", In Journal of IEEE Transactions on Systems, Man, and Cybernetics, Part B: Cybernetics, vol. 40, Issue 5, Oct. 1, 2010, pp. 1398-1412.
Yu, et al., "Discriminative Orderlet Mining for Real-Time Recognition of Human-Object Interaction", In Proceedings of the 12th Asian Conference on Computer Vision, Nov. 1, 2014, pp. 1-16.
Yun, et al., "Two-Person Interaction Detection Using Body-Pose Features and Multiple Instance Learning", In Proceedings of the IEEE Conference on Computer Vision and Pattern Recognition Workshops, Jun. 16, 2012, 8 Pages.
Zaremba, et al., "Recurrent Neural Network Regularization", In Journal of Computing Research Repository, Sep. 8, 2014, 8 Pages.
Zhang, Zhengyou, "Microsoft Kinect Sensor and Its Effect", In Proceedings of the IEEE Multimedia, Feb. 2012, vol. 19, Issue 2, Apr. 27, 2012, pp. 4-10.
Zhao, et al., "Information Theoretic Key Frame Selection for Action Recognition", In Proceedings of the British Machine Vision Association, Sep. 2008, 10 Pages.
Zhu, et al., "Co-occurrence Feature Learning for Skeleton Based Action Recognition Using Regularized Deep LSTM Networks", In Proceedings of the Thirtieth AAAI Conference on Artificial Intelligence, Feb. 12, 2016, 7 Pages.

\* cited by examiner

NEURAL NETWORK-BASED ACTION DETECTION

CROSS-REFERENCE TO RELATED APPLICATION

This application is a U.S. National Stage Application of PCT/US2017/059139, filed Oct. 31, 2017, which claims benefit of Chinese Patent Application No. 201610987537.0, filed Nov. 9, 2016, which applications are hereby incorporated by reference. To the extent appropriate, a claim of priority is made to each of the above disclosed applications.

BACKGROUND

Detection of actions or activities of various entities (e.g., humans, robots, animals, or other moving objects) has many important applications, including but not limited to surveillance, health care, human-computer interaction, intelligent robot navigation, computer games, and so on. Action detection is usually dependent upon a training model called "action classifier" which is trained on videos related to one or more known actions. Once trained, the model may be used to process an incoming video to determine whether a particular action takes place in this video. Despite efforts over many years, model-based detection of actions of entities continues to be a challenging task. It is expected to further improve the action recognition property to apply it to various applications. To be specific, there is room and need for improvement in quick and efficient recognition of key features, accuracy of action recognition and complexity reduction of model training, etc.

SUMMARY

In accordance with implementations of the subject matter described herein, a neural network-based action detection scheme is proposed. The action detection scheme relies on the fact that different frames in the video or video clip have different influence on discriminative power of the classification result. Thus, different importance (also called "attention") of different frames in the video or video clip can be accounted for so that the neural network model tends to assign higher weight to frames with greater importance or higher discriminative power for action recognition and lower weight to frames with less importance or lower discriminative power for action recognition. Similarly, in a video frame, different areas (for example, also referred to as "joints" in skeleton representation) have different importance so that the neural network model tends to assign higher weight to areas with greater importance or higher discriminative power for action recognition and lower weight to areas with less importance or lower discriminative power for action recognition.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

The subject matter described herein will now be discussed with reference to several example implementations. It should be understood these implementations are discussed only for the purpose of enabling those skilled persons in the art to better understand and thus implement the subject matter described herein, rather than suggesting any limitations on the scope of the subject matter.

As used herein, the term "includes" and its variants are to be read as open terms that mean "includes, but is not limited to." The term "or" is to be read as "and/or" unless the context clearly indicates otherwise. The term "based on" is to be read as "based at least in part on." The term "one implementation" and "an implementation" are to be read as "at least one implementation." The term "another implementation" is to be read as "at least one other implementation." The terms "first," "second," and the like may refer to different or same objects. Other definitions, explicit and implicit, may be included below. A definition of a term is consistent throughout the description unless the context clearly indicates otherwise.

Overview

Generally, action detection based on a video or video clip comprising a plurality of frames takes into account each frame comprehensively. For example, these frames are treated and processed in an equivalent way. According to an implementation of the subject matter described herein, influence of different frames on decision of classification may be taken into account to design and optimize the neural network model, such that different importance is assigned to different frames. For example, higher weight is assigned to frames with greater importance or higher discriminative power for action recognition and lower weight is assigned to frames with less importance or lower discriminative power for action recognition. In this manner, model accuracy can be further improved, thereby facilitating action recognition.

Figure 1:
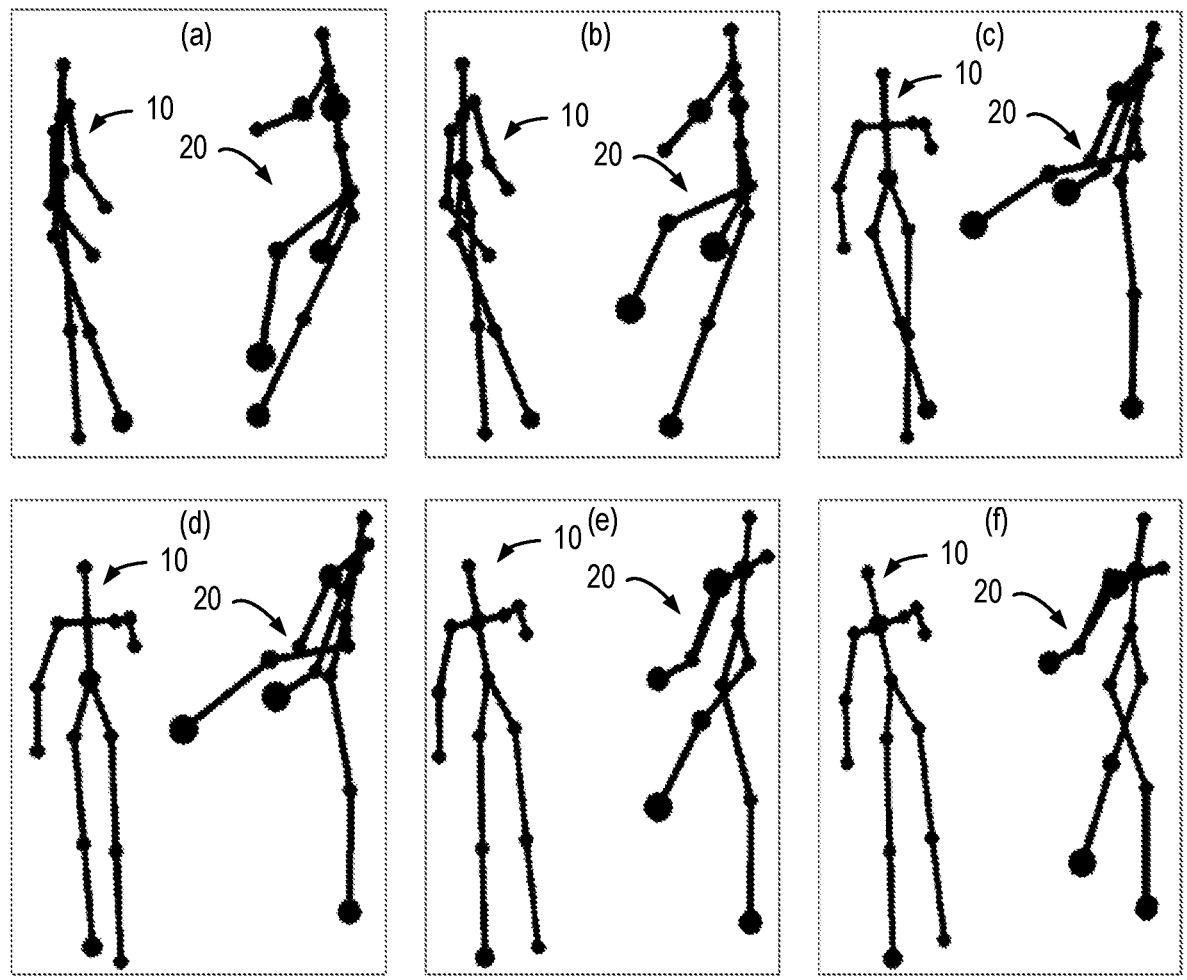
FIG. 1 illustrates an example scenario in accordance with one implementation of the subject matter described herein.

FIG. 1 illustrates an example scenario in accordance with one implementation of the subject matter described herein, comprising six frames from (a) to (f) in chronological order. Each frame includes objects 10 and 20 representing the victim and the kicker, respectively. It can be seen that the kicking action as shown in FIG. 1 can be divided into multiple phases, such as the preparing phase (a)-(b), kicking phase (c)-(d) and the leg retracting phase (e)-(f), in which the kicking phase is the most discriminative phase for action recognition. Thus, more attention can be assigned to the kicking phase to facilitate action recognition and accuracy improvement.

In some implementations, spatial attention may be considered. For example, in the example scenario illustrated in FIG. 1, the foot action of the kicker is the most discriminative for recognition of this action. Therefore, higher weight can be assigned to the foot of the kicker during action recognition.

Various example implementations of the subject matter described herein will be described below in detail with reference to the drawings.

Example Environment

Figure 2:
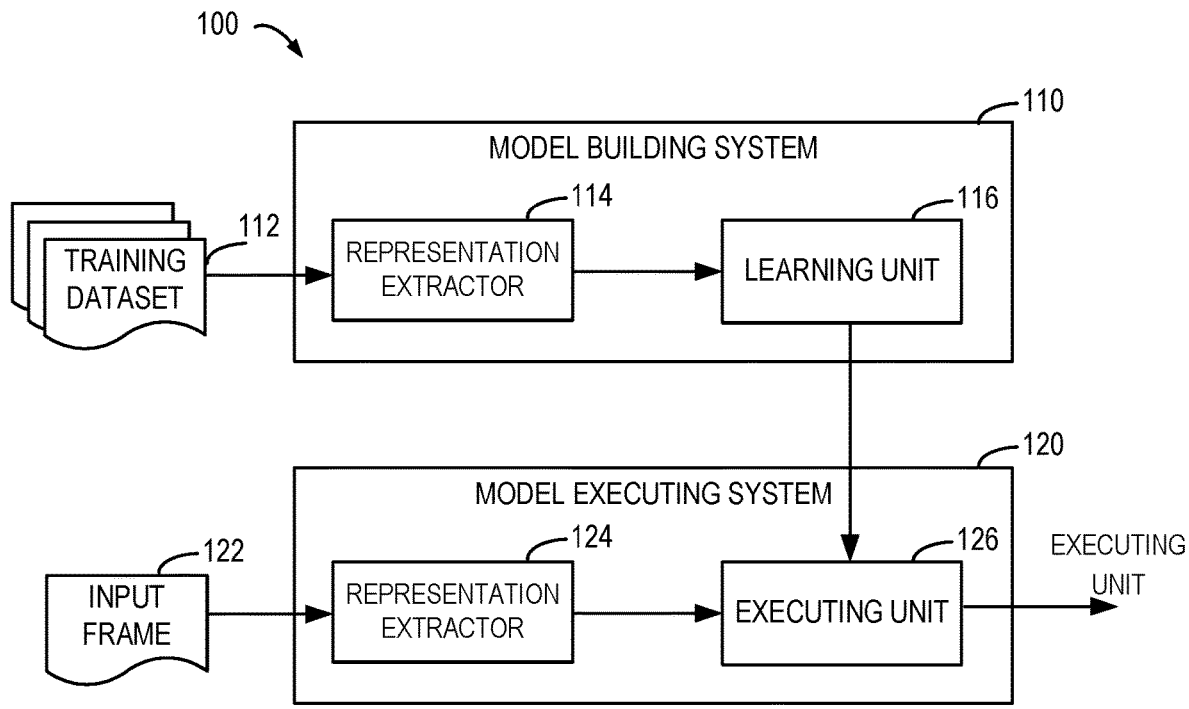
FIG. 2 illustrates a block diagram of an environment in which implementations of the subject matter described herein can be implemented.

FIG. 2 illustrates a block diagram of an environment 100 in which implementations of the subject matter described herein can be implemented. It is to be understood that the structure and functionality of the environment 100 are described only for the purpose of illustration without suggesting any limitations as to the scope of the subject matter described herein. The subject matter described herein can be embodied with a different structure and/or functionality.

The environment 100 includes a model building system 110 and a model executing system 120. The model building system 110 is configured to build a model for action detection from a training dataset 112. The dataset 112 may include one or more labeled videos. These videos or video clips may be labeled as being associated with a predefined action of an entity or entities therein. For example, the videos or video clips may be classified as being associated with predefined actions including drinking, eating, washing hands, opening an appliance, sweeping, gargling, throwing trash, wiping, and the like. The entities may be, for example, humans, robots, animals, or other moving objects. Any other actions of the entities in the videos may also be recognized and labeled. The labeling of the videos or frames may be performed automatically and/or manually. The action label of the videos and frames may also be provided in the dataset 112.

A representation extractor 114 included in the model building system 110 may be configured to extract representation information of respective frames in the videos in the dataset 112. Generally, the frames of the videos cannot be directly used to train the model for action detection. Instead, a smaller amount of information characterizing the entity or entities in the frame may be extracted to train the model, which will help improve the accuracy and efficiency of the training process. Representation information of a frame may represent an entity in the frame. In some cases, if more than one entity is included in a frame, the representation information of the entity of interest can be determined. Alternatively, representation information of all the entities in the frame may be used.

In some implementations, the representation information may be skeleton representation of the entity/entities in the frame. The skeleton representation may include information of at least one joint of the entity/entities in the frame, including two-dimensional ("2D") or three-dimensional ("3D") position information of the joint(s). The joint information may be obtained by identifying the skeleton structure(s) of the entity/entities from a two-dimensional image of the frame or by taking the video utilizing depth cameras. Alternatively, or in addition, other representation information may be used, such as Histograms of Oriented Gradient (HOG) in an intensity image or information extracted by an algorithm of Scale-Invariant Feature Transform (SIFT).

In some implementations, the extraction of the discriminative features is based on RGB video, which is generally two-dimensional information, thus losing some of the three-dimensional information, for example, flexibility of achieving human location and scale invariant. Skeleton representation denotes the 3D coordinate positions of key joints and is robust to variations of locations and viewpoints. FIG. 1 illustrates an example of skeleton representation. It can be seen from the skeleton representation of FIG. 1 that the action is a kicking action. Moreover, it can be seen that the kicking action may be divided into multiple phases, such as a preparing phase, a kicking phase and a leg retracting phase, in which the kicking phase is the most discriminative phase for action recognition. Furthermore, from the spatial perspective, foot action of the kicker is the most discriminative for recognition of the action. Therefore, these factors can be taken into account during action recognition.

Now returning to FIG. 2, a learning unit 116 included in the model building system 110 is configured to learn a model for action detection based on the representation information and predefined action labels of the frames in the training dataset 112. A structure of the model may be constructed first. The objective of the learning process is to determine parameters for the structure of the model. The model may be represented as one or more functions of the representation information of the frames and the corresponding action labels.

In some implementations, the trained model from the model building system 110 may be provided to the model executing system 120 to recognize an action from one or more new frames. Specifically, a representation extractor 124 receives an input frame 122 and extracts representation information of the frame. The representation information may be provided to an executing unit 126 as an input to the trained model. An output of the model may indicate whether the frame is associated with any of the predefined action labels. Generally, a plurality of frames related to those predefined action labels have been used to train the model in the model building system 110.

Although the representation extractor 114 is shown as being included in the system 110 in FIG. 2, in some implementations, the representation extractor 114 may be separated from the system 110. The training frames may be processed by a remote representation extractor. The dataset 112 input to the model building system 110, for example, to the training unit 116, may then include the extracted representation information of frames and corresponding predefined action labels. In some implementations, the representation extractor 124 may also be separated from the model executing system 120.

In accordance with implementations of the subject matter described herein, a model used for action detection is constructed as a learning network including main network and temporal attention sub-network and/or spatial attention sub-network. The learning network further includes a neural network unit, such as recurrent neural network, RNN unit. The learning network having RNN unit may be referred to as a recurrent neural network and the elements included in the network may be referred to as neurons. Hereinafter, the terms "learning network," "learning model," "neural network," and "recurrent neural network" are used interchangeably. The terms "element" and "neuron" are used interchangeably. The RNN neurons may be designed to learn features from the frames (or representation information of the frames). The classification element may be used to classify the frames into predefined groups based on the features. As used herein, the term "features" refers to information of (temporal) dynamics of a frame learned by the RNN elements. With the RNN neurons, the learning network is powerful for outputting a desirable detection result based on limited knowledge.

In some implementations, the learning network and its sub-network may be a multi-layered neural network. The RNN neurons may be arranged as one or more RNN layers, each layer including one or more RNN neurons. The RNN layers may constitute a feature learning sub-network. The first RNN layer receives representation information of an input frame and outputs learned features to the next layer. The other RNN layer continues processing the features and provides the updated features to a subsequent layer. For deep learning and higher accuracy of the learning network, a fully-connected (FC) layer may be arranged between every two RNN layer. The fully-connected layer may include one or more neurons for feature fusion and update the features from a RRN layer based on a non-linear function.

Figure 3A:
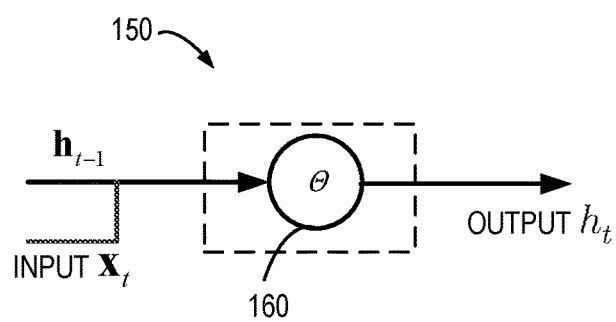
FIG. 3a illustrates a block diagram of a structure of an example recurrent neural network (RNN) neuron in accordance with one implementation of the subject matter described herein.

FIG. 3a illustrates an example RNN neuron 150 comprising a non-linear element 160, also called non-linear activation function. A RNN neuron has a self-connected recurrent connection which models the temporal evolution, considering both the current input and its preceding output. To better understand the neural network, a typical processing of RNN neuron 150 may be represented as below:

$$h_t = \theta(W_{xh}x_t + W_{hh}h_{t-1} + b_h) \quad (1)$$

where $h_t$ represents the output response of the RNN layer at a point of time t, $x_t$ represents the input of the RNN layer at a point of time t; $W_{xh}$ represents a mapping matrix from the input $x_t$ to the output $h_t$, $W_{hh}$ represents a mapping matrix inside the RNN layer from the output $h_{t-1}$ at a preceding point of time t−1 to the current output $h_t$, $b_h$ represents a bias vector, and $\theta(\cdot)$ represents a non-linear function which is represented by non-linear element 160 in FIG. 3a. The non-linear function may be a tangent function, a sine function, a sigmoid function, or any other function that can apply non-linearity to the input. It will be noted that the recursive computation in the RNN neurons may be represented in other forms.

Figure 3B:
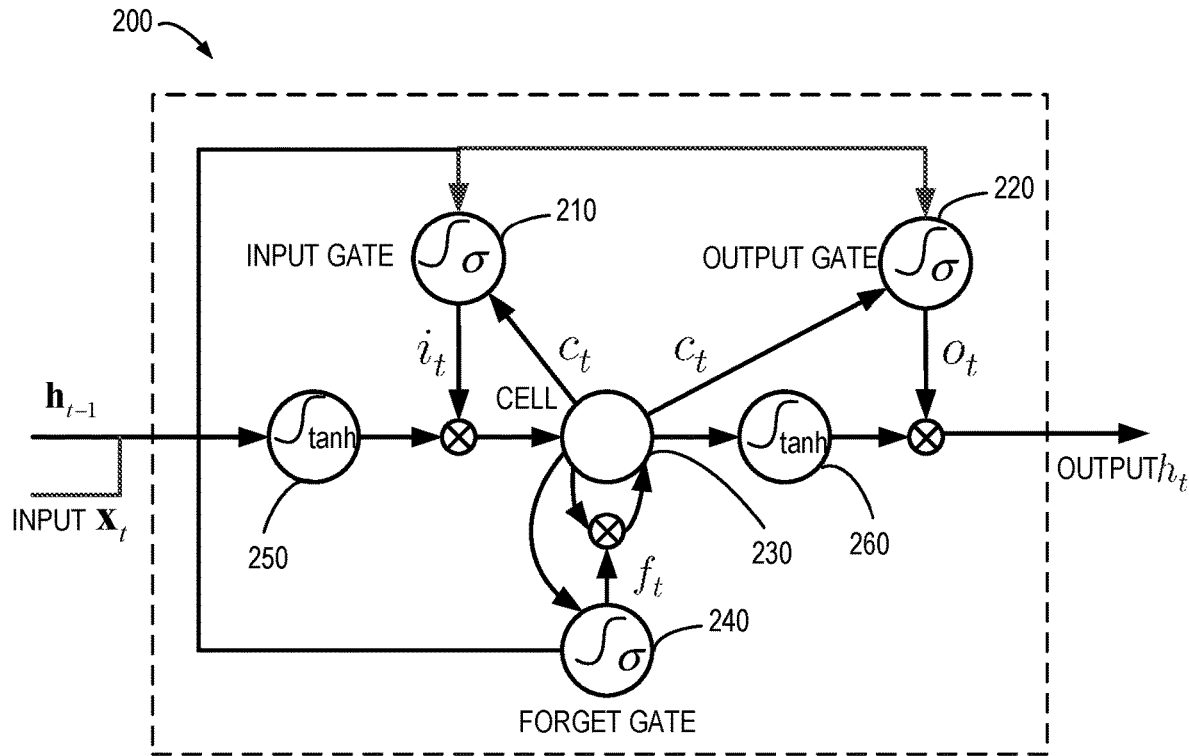
FIG. 3b illustrates a block diagram of a structure of an example LSTM neuron in accordance with one implementation of the subject matter described herein.

In some implementations, the RNN elements may suffer from vanishing gradient effect. To overcome this limitation, long short-term memory (LSTM) neurons may be used instead of the normal RNN neurons. A structure of a typical LSTM neuron 200 is shown in FIG. 3b. As shown, the LSTM neuron 200 includes an input gate 210, an output gate 220, a memory cell 230, a forget gate 240, and two non-linear cells 250 and 260. The input gate 210 and the forget gate 240 control the information flow into and out of the memory cell 230. The output gate 220 controls how much information from the memory cell 230 is transmitted to the output $h_t$ of the LSTM neuron 200. The memory cell 230 has a self-connected recurrent edge of weight 1, ensuring that the gradient can pass across many time steps without vanishing or exploding. Therefore, this structure allows the LSTM neuron 200 to memorize and access information before many time steps, thus overcoming difficulties in training the neural network caused by the vanishing gradient effect.

Though principles of the subject matter described herein are described mainly in combination with RNN neuron or LSTM neuron in the present text, it will be understood that current neurons or neurons of other types to be developed in the future can also be used to implement the principles of the subject matter described herein.

Model Architecture

Figure 4:
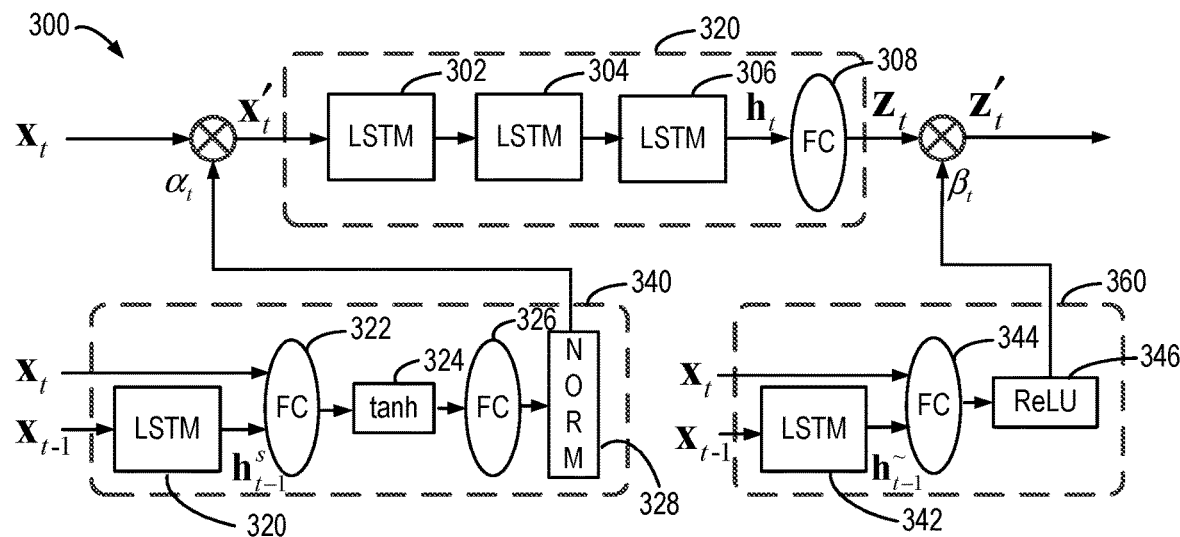
FIG. 4 illustrates a block diagram of a structure of a learning network in accordance with one implementation of the subject matter described herein.

FIG. 4 illustrates the overall architecture of a learning network 300. As shown, the learning network 300 comprises a main network 320. As shown in FIG. 4, the main network 320 receives an input $x_t$ which can be representation information of a frame output at time step t by the representation extractor 114 or 124 as shown in FIG. 2. In the case of skeleton representations, the input $x_t$ can be a full set of K joints at time step t, $x_t = (x_{t,1}, \ldots, x_{t,K})^T$ where $x_{t,k} \in \mathbb{R}^3$, K is an integer from 1 to K. In other words, in the case of skeleton representations, the input $x_t$ can be a set of three-dimensional spatial coordinates of K joints.

As shown, the main network 320 comprises LSTM layers 302, 304, 306, and a fully connected (FC) layer 308. The output $h_t$ at the LSTM layer 306 is fed to the FC layer 308 so as to obtain the output $z_t$ of the main network 320.

It is to be understood that although three LSTM layers and an FC layer are illustrated in the main network 320, the main network 320 may comprise other LSTM layers or FC layers or some of these LSTM layers or FC layers can be omitted. In some implementations, the main network 320 may comprise only one LSTM layer which comprises a plurality of LSTM neurons. In some implementations, one or more LSTM layers can be replaced by normal RNN layers comprising a plurality of RNN neurons. In some other implementations, the main network 320 may comprise other neural network layers not shown or may be arranged in a different order from as shown in FIG. 4.

In some implementations, the learning network 300 may also be provided with a spatial attention sub-network 340. The spatial attention sub-network can obtain importance of each part or focus point of each frame, which is also called weight or attention. In some implementations, each frame can be divided into a plurality of parts, the weight of each part being obtained by the spatial attention sub-network 340. In some implementations, several focus points of each frame can be determined and then attention assigned to respective focus points is determined by the spatial attention sub-network 340. Different from the static division of frame, the focus point can change dynamically with time and is not limited to a certain static part of the frame. For example, in the implementation of the skeleton representations, weight can be determined for respective joints of human skeleton representations with the spatial attention sub-network 340. In the following, basic principles of the spatial attention sub-network 340 are described in combination with skeleton representations. However, it should be understood that the principles are readily applied to other implementations based on focus point or based on area division.

In the spatial attention sub-network 340, score $s_t$ that indicates importance of K joints can be obtained by the following equation (2):

$$s_t = U_s \tanh(W_{xs}x_t + W_{hs}h_{t-1}^s + b_s) + b_{us} \quad (2)$$

where $U_s$, $W_{xs}$ and $W_{hs}$ are the learnable parameter matrixes, $b_s$ and $b_{us}$ are the bias vectors, score vector $s_t = (s_{t,1} \ldots, s_{t,K})^T$, $h_{t-1}^s$ is the hidden variable from LSTM layer 320 and the function tanh(·) denotes hyperbolic tangent function.

For the $k^{th}$ joint, the activation value for activating the selection gate, which is a normalization of the scores, can be expressed as:

$$\alpha_{t,k} = \frac{\exp(s_{t,k})}{\sum_{i=1}^{K} \exp(s_{t,i})} \quad (3)$$

The set of gates controls the amount of information of each joint to flow to the main network 320. Among the joints, the larger the activation value is, the more important this joint is for determining the class of action. The activation values are also referred to as attention weights. Conventionally, an equal weight is assigned to all the joints $x_t$. In contrast, as illustrated in FIG. 4, the input to the main network is modulated by activation values to be $x'_t = (x'_{t,1}, \ldots, x'_{t,K})^T$, (where $x'_{t,k} = \alpha_{t,k} \cdot x_{t,k}$.

Principles of the spatial attention sub-network 340 are described above in combination with equations (2) and (3). For the sake of clarity, description is made further in combination with the example structure of spatial attention sub-network 340 shown in FIG. 4. As shown in FIG. 4, the spatial attention sub-network 340 receives the representation information $x_t$ and $x_{t-1}$ of frames of the current time step t and the preceding time step t−1. The representation information $x_{t-1}$ of the frame of the preceding time step t−1 is fed to LSTM layer 320 to determine the hidden variable $h_{t-1}^s$ which includes information on the previous frames, which is made possible because LSTM can employ long term memory effect. Representation information $x_t$ and hidden variable $h_{t-1}^s$ are fed to the FC layer 322, which feeds an output that can be represented by $W_{xs}x_t + W_{hs}h_{t-1}^s + b_s$ to a tanh unit 324. Then, the tanh unit 324 and the linear fully connected layer determine score $s_t$ and thus determine which joints are more discriminative for action recognition. In this regard, the tanh unit 324 is also called selection gate. It is to be understood that although the hyperbolic tangent function is used as a non-linear activation function, any other suitable non-linear functions may also be employed.

Because the range of the hyperbolic tangent function is (−1, 1), score $s_t$ may be normalized to facilitate subsequent processing. Furthermore, normalization of score $s_t$ can help control the dynamic range of "attention." Therefore, the spatial attention sub-network 340 may also comprise a normalization unit 328 which can normalize the score $s_t$ in accordance with equation (3) to obtain the final spatial attention $\alpha_t$.

After the spatial attention sub-network 340 determines the spatial attention $\alpha_t$, the input $x_t$ at time step t can be weighted by the spatial attention $\alpha_t$ to obtain the corrected input $x'_t$, which is then fed to the main network 320. In the implementation shown in FIG. 4, the spatial attention is fed to the input of the main network 320 and combined with the input of the current frame. Alternatively, spatial attention can also be fed to the main network 320 at the input or other locations of the main network 320.

Video can be regarded as a sequence comprising a plurality of frames.

However, the amount of valuable information provided by different frames is not equal. Only some of the frames (for example, key frames) contain the most discriminative information while the other frames only provide context information. For example, for the action "shaking hands," the sub-stage "approaching" should have lower importance than the sub-stage of "hands together." Based on such insight, a temporal attention module can be designed to automatically pay different levels of attention to different frames.

As shown in FIG. 4, the temporal attention sub-network 360 includes a LSTM layer 342, a FC layer and a rectified linear unit (ReLU) 346. The temporal attention sub-network 360 plays the role of a soft frame selection. The activation as the frame-selection gate can be obtained as:

$$\beta_t = \text{ReLU}(w_{x\_}x_t + w_{x\_}h_{\tilde{t}-1} + b_\_) \quad (4)$$

which depends on the current input $x_t$ and the hidden variables $h_{\tilde{t}-1}$ of time step t−1 from the LSTM layer 342. ReLU 346 is employed here due to its good convergence performance. However, other non-linear units can also be employed. ReLU 346 is a gate used to control the amount of information of each frame on the final classification decision.

Principles of temporal attention sub-network 360 are described above in combination with equation (4). For the sake of clarity, description will be made in the following further in combination with the example structure of temporal attention sub-network 360 shown in FIG. 4. As shown in FIG. 4, the temporal attention sub-network 360 receives the representation information $x_t$ and $x_{t-1}$ of frames of the current time step t and the preceding time step t−1. The representation information $x_{t-1}$ of the frame of the preceding time step t−1 is fed to the LSTM layer 342 to determine the hidden variable $h_{\tilde{t}-1}$, which includes information of the past frames, because LSTM can employ long term memory effect. Representation information $x_t$ and hidden variable $h_{\tilde{t}-1}$ are fed to the FC layer 344, which feeds an output that can be represented by $w_{x\_}x_t + w_{x\_}h_{\tilde{t}-1} + b_\_$ to ReLU 346. Then, ReLU 346 determines importance or attention of the frame at time step t and thus determines which frames are more discriminative for action recognition. In this regard, ReLU 346 is also called selection gate. It will be understood that although the rectified linear unit is used as the non-linear activation function here, any other suitable non-linear functions can also be used.

After the temporal attention sub-network 360 determines the temporal attention $\beta_t$, the output $z_t$ of the main network 320 can be weighted by temporal attention $\beta_t$ to obtain the corrected output $z'_t$. In the implementation shown in FIG. 4, the temporal attention is fed to the output of the main network 320 and combined with the output of the main network 320. Alternatively, temporal attention can also be fed to the main network 320 at the input or other locations of the main network 320.

It is to be understood that although the examples shown in FIG. 4 include the spatial attention sub-network 340 and the spatial attention sub-network 360, in other implementations, only one of them can be used. Furthermore, although only one LSTM layer is illustrated in both spatial attention sub-network 340 and spatial attention sub-network 360, more than one LSTM layers can also be used in other implementations.

A learning network 300 for a time step is described above in combination with FIG. 4. However, for action recognition, a plurality of video frames should be analyzed to determine the action type. In the following, a neural network model 500 based on multiple frames of multiple time steps is described.

Figure 5:
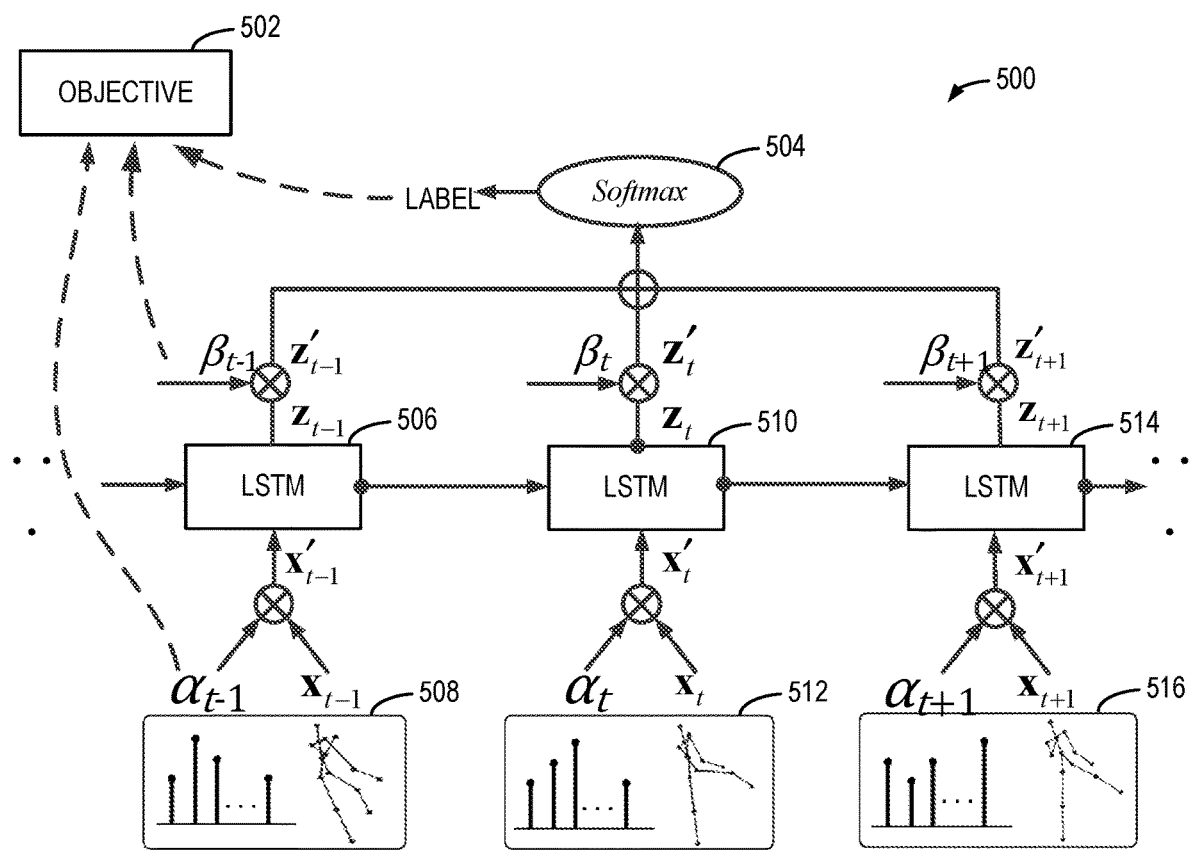
FIG. 5 illustrates a schematic diagram of a model in accordance with one implementation of the subject matter described herein.

The model 500 may comprise a branch for each frame, which, for example, can be implemented by the learning network 300 shown in FIG. 4. For the sake of simplicity, the attention sub-network for each branch is not illustrated here while only the output provided by the attention sub-network is provided. For example, FIG. 5 illustrates three branches of video frames at three time steps t−1, t, and t+1. Blocks 508, 512, and 516 schematically illustrate the input of spatial attention and skeleton representations for three time steps t−1, t, and t+1. For example, at the branch of time step t, block 512 includes spatial attention for each joint shown graphically and the skeleton representation of the video frame illustrated in the form of skeletons. Main networks 506, 510, and 514 obtain the respective inputs $x'_{t-1}$, $x'_t$, and $x'_{t+1}$ from the blocks 508, 512, and 516, which are obtained by weighted sum of their respective spatial attention of $\alpha_{t-1}$, $\alpha_t$, and $\alpha_{t+1}$ and representation information $x_{t-1}$, $x_t$, and $x_{t+1}$ of frames. Outputs $z_{t-1}$, $z_t$, and $z_{t+1}$ are obtained through processing in the main networks 506, 510, and 514. As shown in FIG. 5, outputs $z_{t-1}$, $z_t$, and $z_{t+1}$ of respective main networks 506, 510, and 514 are multiplied with their respective temporal attention $\beta_{t-1}$, $\beta_t$, and $\beta_{t+1}$ to obtain the corrected outputs $z'_{t-1}$, $z'_t$ and $z'_{t+1}$. The above process has been described in detail in connection with FIG. 4 and thus is omitted here.

It should be understood that although only the input as a frame (or representation information) for each RNN layer (for example, LSTM layer) is described, it also includes the input provided by the output of the respective RNN layer at the preceding time step, as shown in FIG. 3b. For example, the output $h_t$ on RNN layer of the main network 320 in FIG. 4 is also provided to the RNN unit of the next time step t+1. Similarly, the output $h_{t-1}{}^s$ on LSTM layer 320 of the spatial sub-network 340 is also provided to respective spatial sub-network at the next time step t; the output $h_{t-1}$ on LSTM layer 342 of the spatial sub-network 360 is also provided to the respective temporal sub-network at the next time step t.

It should be understood that although multiple main networks 506, 510, and 514 are illustrated in FIG. 5, in some implementations, learning network may comprise only one main network 320 as shown in FIG. 4. The main network can successively process video inputs for different frames or different time steps. In other words, the output for the preceding frame is the input for the next frame but they share the same network structure and network parameters. Similarly, the number of temporal attention sub-networks as wells as spatial attention sub-networks can also be only one.

Action recognition is a classification problem in a sequence level. Thus, the scores for C classes may be determined based on the corrected outputs $z'_{t-1}$, $z'_t$, and $z'_{t+1}$ of each main network (namely, a product of output $z_t$ of the main network at each temporal step t and the respective temporal attention $\beta_{t-1}$, $\beta_t$ and $\beta_{t+1}$). In some implementations, score o for C classes can be determined by summing the corrected outputs $z'_{t-1}$, $z'_t$ and $z'_{t+1}$:

$$o = \sum_{t=1}^{T} \beta_t \cdot z_t \qquad (5)$$

where $o=(o_1, o_2, \ldots, o_C)^T$ and T represents the length of the sequence or number of frames.

Then, score o is fed to the Softmax unit 504, where probability of each class is determined. For example, for a given sequence X, probability that the sequence is predicted as the $i^{th}$ class is:

$$p(C_i \mid X) = \frac{e^{o_i}}{\sum_{j=1}^{C} e^{o_j}}, k = 1, \ldots, C \qquad (6)$$

The objective function 502 receives probability of each class from the Softmax unit 504 and temporal attention of each frame from the temporal attention sub-network and spatial attention of each frame from the spatial attention sub-network and network parameters. During the training of the learning network 500, parameters of learning network 500 can be determined by minimizing the objective function 502 based on the predefined action label corresponding to each video.

The objective function 502 can be represented as:

$$L = -\sum_{i=1}^{C} \hat{y}_i \log y_i + \lambda_1 \sum_{k=1}^{K} \left(1 - \frac{\sum_{t=1}^{T} \alpha_{t,k}}{T}\right)^2 + \frac{\lambda_2}{T}\sum_{t=1}^{T} \|\beta_t\|_2 + \lambda_3 \|W_{uv}\|_1, \qquad (7)$$

where $y=(y_1, \ldots, y_c)^T$ denotes ground truth label. If the sequence belongs to $i^{th}$ class, then $y_i=1$ and for $j \ne i$, then $y_j=0$. The quantity $\hat{y}_i$ represents the probability that the sequence is predicted as the $i^{th}$ class, where $\hat{y}_i=p(C_i|X)$, as shown in equation (6), for example. Moreover, $\|\bullet\|_2$ and $\|\bullet\|_1$ denote $l_2$ norm and $l_1$ norm and the scalars $\lambda_1$, $\lambda_2$ and $\lambda_3$ balance the contribution of the three regularization terms.

The first term of the objective function 502 represented by equation (7) is the cross-entropy loss which is a loss function commonly used in the neural network. It is to be understood that any other suitable loss functions can also be used.

The second term of the objective function 502 represented by equation (7) is a regularization term for spatial attention sub-network, which is designed to encourage the spatial attention model to focus on more spatial joints in a sequence, namely, to distribute attention evenly. This is because it is found that the spatial attention model is prone to ignoring many joints over time even though these joints are also valuable for determining the class of action. In other words, the spatial attention model is likely to be trapped to a local optimum. Therefore, this regularization term is introduced to avoid such a problem.

The third term of the objective function 502 represented by equation (7) is a regularization term for a temporal attention sub-network, which is designed to regulate the learned temporal attention under control with $l_2$ norm rather than to increase the temporal attention unboundedly. This alleviates the gradient problem in the back propagation.

The fourth term of the objective function 502 represented by equation (7) has $l_1$ norm to prevent overfitting of the overall model. The symbol $W_{uv}$ denotes the connection matrix of the model (all parameters are merged to one matrix here to simplify the symbols).

Model Training

Figure 6:
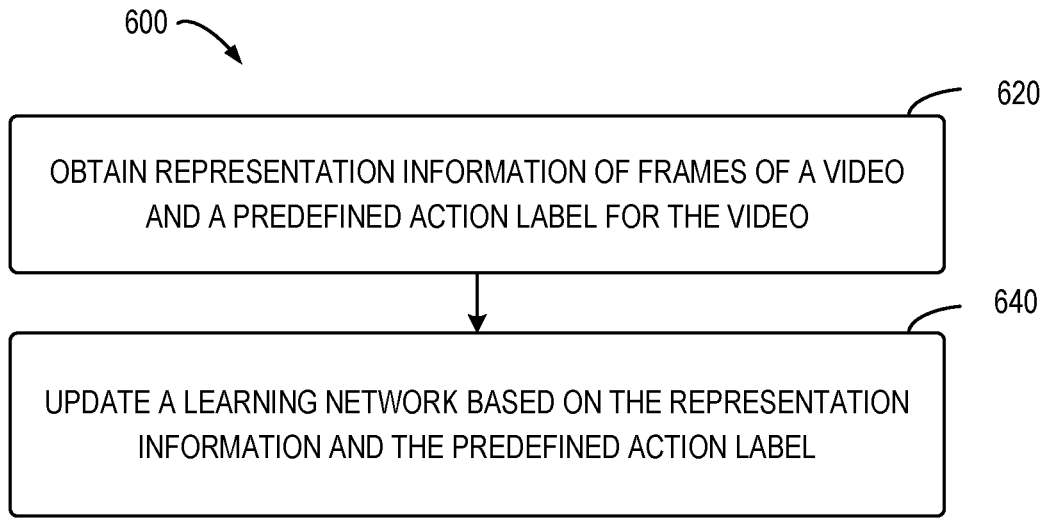
FIG. 6 illustrates a flowchart of a method of action detection in accordance with one implementation of the subject matter described herein.

FIG. 6 illustrates a flowchart of a method 600 of action detection in accordance with one implementation of the subject matter described herein. The method 600 can be, for example, implemented by the learning unit 116 as shown in FIG. 2. At 620, representation information of a plurality of frames of a video and a predefined action label for the video are obtained, where the representation information represents an entity in the plurality of frames. In some implementations, representation information may comprise skeleton representation associated with the entity.

A dataset including frames of labeled videos or video clips can be used to train the model 500. Each video or video clip can be labeled with a corresponding action label. The training objective is directed to determine the parameters included in the model 500, for example mapping matrix (and bias matrix), which is generally performed by minimizing an objective function.

At 640, the learning network is updated based on the representation information of the plurality of frames and the predefined action label. In some implementations, the learning network may be the learning network 300 in FIG. 4 or the learning network of the model 500 shown in FIG. 5 or a part of the learning network of the model 500. In some implementations, the parameters included in the learning network may be initialized to, for example, some random values or fixed values. The learning network may include a neural network layer or a neural network unit, for example a RNN layer or a RNN unit. In some implementations, the RNN unit may be an LSTM unit.

In some implementations, the parameters of the learning network can be determined or updated based on representation information of frames and corresponding predefined action labels. In some implementations, training methods such as alternating least square (ALS), stochastic gradient descent (SGD), or limited-memory BFGS (Broyden, Fletcher, Goldfarb, and Shanno) may be employed to train the learning network. Additionally, a Back Propagation Through Time (BPTT) method may be used to update the parameters in an iteration process.

As described above, the learning network may be the learning network 300 as shown in FIG. 4 or the learning network of the model 500 as shown in FIG. 5 or part of the learning network of the model 500. In some implementations, the learning network may include a first sub-network which can determine the importance of respective frames based on representation information. For example, the first sub-network can be the temporal attention sub-network as shown in FIG. 4 or FIG. 5. The learning network can determine the probability of a plurality of input frames being associated with a predefined action label. In some implementations, the learning network includes a main network. An output of the main network is combined with the importance determined by the first sub-network. For example, the output of the main network may be combined with the importance determined by the first sub-network by way of equation (5).

In some implementations, the learning network further includes a second sub-network that determines the importance of a plurality of predefined portions or predefined points of interest in respective frames based on the representation information. In some implementations, the main network may further receive as input the importance determined by the second sub-network. For example, the second sub-network may be the spatial attention sub-network as shown in FIG. 4 or FIG. 5.

In some implementations, the first sub-network receives representation information for a first frame and a second frame preceding the first frame among the plurality of frames and determines the importance of the first frame based on a non-linear function. In some implementations, the first sub-network includes a neural network unit which receives the second frame as input and provides the output to the non-linear function. In some implementations, the neural network unit may be a RNN unit, for example an LSTM unit.

In some implementations, the second sub-network receives representation information for the first frame and the second frame preceding the first frame among the plurality of frames and determines the importance of a plurality of predefined portions or a plurality of predefined points of interest in the frame based on a non-linear function.

In some implementations, the second sub-network includes a neural network unit that receives the second frame as input and provides the output to the non-linear function. In some implementations, the neural network unit may be a RNN unit, for example an LSTM unit. In some implementations, the second sub-network may also include a normalization unit configured to normalize the output of the non-linear function to determine importance of the first frame.

In some implementations, updating the learning network includes updating the learning network to minimize an objective quantity based on the probability for the action label output by the learning network and the importance determined by the first sub-network. The objective quantity limits an increase of a value of the importance determined by the first sub-network. In some implementations, the objective quantity may be the objective function or part of the objective function as shown by equation (7). As described above, the third term of the objective function shown by equation (7) (i.e. the second regularization term) is used to regulate the learned temporal attention under control with $l_2$ norm to prevent its unbounded increase.

In some implementations, updating learning network includes updating the learning network to minimize an objective quantity based on the probability for the action label output by the learning network and the importance determined by the second sub-network. The objective quantity facilitates the importance determined by the second sub-network to be distributed evenly in the plurality of portions or the plurality of points of interest in the plurality of input frames. In some implementations, the objective quantity can be the objective function or a part of the objective function as shown by equation (7). As described above, the second term of the objective function shown in equation (7) (i.e. the first regularization term) is used to cause the learned spatial attention to be inclined to be distributed evenly so as to prevent the learning network from ignoring many portions or points of interest over time.

In accordance with one or more implementations of the subject matter described herein, in addition to the main network, the learning network may further include a first sub-network (e.g. a temporal attention sub-network) and/or a second sub-network (e.g. a spatial attention sub-network). In this manner, the learning network has a complex structure, which makes it difficult to perform conventional optimization or training. Therefore, there is proposed a method for updating this learning network. In short, the method includes a pre-training stage for the first type of sub-network (e.g. a temporal attention model), a pre-training stage for the second type of sub-network (e.g. a spatial attention model), a training stage for the main network and a jointly training stage. It is to be understood that one or more of these stages can be omitted for different learning networks and the order of these stages can be adjusted. For the purpose of clarity, the following will be described in the order of the pre-training for the temporal attention model, the pre-training for the spatial attention model, the training for the main network and the joint training.

In some implementations, the pre-training stage for the temporal attention model may include: with parameters of the spatial attention sub-network being fixed, updating parameters of the temporal attention sub-network and the main network. In some implementations, updating parameters of the temporal attention sub-network and the main network comprises: with the parameters of the spatial attention sub-network being fixed, updating the parameters of the temporal attention sub-network and the parameters of a simplified main network. Then, with the updated parameters of the temporal attention sub-network being fixed, updating the parameters of the main network. Next, the parameters of the temporal attention sub-network and the main network are jointly updated.

For example, the weight of the spatial attention sub-network may be fixed as unity 1 and the temporal attention sub-network and a simplified main network with only one LSTM layer are trained jointly to obtain parameters of the temporal attention sub-network. Then, the learned temporal attention sub-network may be fixed and the main network that is not simplified is trained. This step can be iterated for $N_1=1000$ times, for example. Next, the temporal attention sub-network and the main network can be jointly trained. This step can be iterated for $N_2=500$ times, for example.

In some implementations, the pre-training stage for the spatial attention model may include: with parameters of the temporal attention sub-network being fixed, updating parameters of the spatial attention sub-network and the main network. In some implementations, updating parameters of the spatial attention sub-network and the main network comprises: with the parameters of the temporal attention sub-network being fixed, updating the parameters of the spatial attention sub-network and the parameters of a simplified main network. Then, with the updated parameters of the spatial attention sub-network being fixed, updating the parameters of the main network. Next, the parameters of the spatial attention sub-network and the main network are jointly updated.

For example, the weight of the temporal attention sub-network may be fixed as unity 1 and the spatial attention sub-network and a simplified main network with only one LSTM layer are trained jointly to obtain parameters of the spatial attention sub-network. Then, the learned spatial attention sub-network may be fixed and the main network that is not simplified is trained. This step can be iterated for $N_1=1000$ times, for example. Next, the spatial attention sub-network and the main network can be jointly trained. This step can be iterated for $N_2=500$ times, for example.

In some implementations, the training stage for the main network includes with the parameters of the first sub-network and the second sub-network being fixed, updating the parameters of the main network. This step may be iterated for $N_1=1000$ times, for example. In some implementations, the joint training stage comprises jointly updating parameters of the learning network. This step may be iterated for $N_2=500$ times, for example.

A Model-Based Recognition Process

Figure 7:
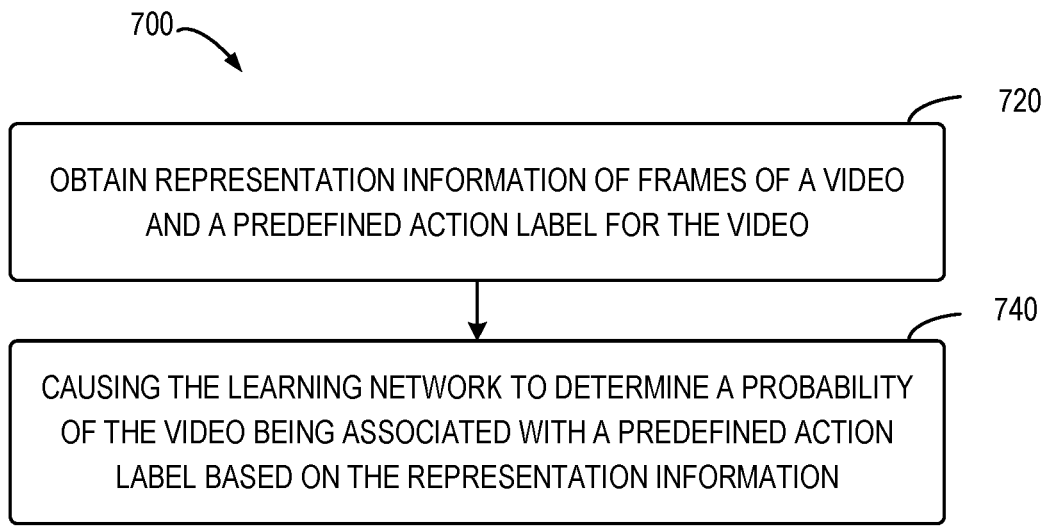
FIG. 7 illustrates a flowchart of a method of action detection in accordance with another implementation of the subject matter described herein.

FIG. 7 illustrates a flowchart of a method 700 of action detection in accordance with an implementation of the subject matter described herein. The method 700 can be implemented by the executing unit 126 shown by FIG. 2. At 720, the method 700 obtains representation information of a plurality of frames of a video, the representation information representing an entity in the plurality of frames. In some implementations, the representation information may include skeleton representation associated with an entity.

At 740, the learning network is caused to determine a probability of the video being associated with a predefined action label based on the representation information. The learning network may be the learning network 300 as shown in FIG. 4 or the learning network of the model 500 as shown in FIG. 5 or part of the learning network of the model 500. In some implementations, the learning network may include a first sub-network that can determine the importance of respective frames based on representation information. For example, the first sub-network may be the temporal attention sub-network as shown in FIG. 4 or FIG. 5. In some implementations, the learning network may further include a second sub-network that can determine the importance of a plurality of predefined portions or predefined points of interest in respective frames based on representation information. In some implementations, the learning network further includes a main network that may further receive as input the importance determined by the second sub-network. For example, the second sub-network can be the spatial attention sub-network as shown in FIG. 4 or FIG. 5. The main network and the sub-network may each include a neural network unit, in particular a RNN unit. In some implementations, the RNN unit may be an LSTM unit.

In some implementations, the output of the main network is combined with the importance determined by the first sub-network to determine the probability of the plurality of input frames being associated with a predefined action label. For example, the output of main network may be combined with the importance determined by the first sub-network by means of equation (5).

In some implementations, the first sub-network receives representation information for a first frame and a second frame preceding the first frame among the plurality of frames and determines the importance of the first frame based on a non-linear function. In some implementations, the first sub-network includes a neural network unit that receives the second frame as input and provides the output to the non-linear function. In some implementations, the neural network unit may be a RNN unit, for example an LSTM unit.

In some implementations, the second sub-network receives representation information of a frame for the second sub-network and receives the representation information of the preceding frame through RNN unit. The second sub-network determines the importance of a plurality of predefined portions or a plurality of predefined points of interest in the frame based on a non-linear function. In some implementations, the second sub-network includes a neural network unit that receives the second frame as input and provides the output to the non-linear function. In some implementations, the neural network unit may be a RNN unit, for example an LSTM unit. In some implementations, the second sub-network may further include a normalization unit configured to normalize the output of the non-linear function so as to determine importance of the first frame.

Tests and Performance

Performance of one or more implementations according to the subject matter described herein will be described in combination with FIGS. 1 and 8-10. Testing dataset uses SBU Kinect Interaction Dataset which is an interaction dataset having two objects. Each person has 15 joints, thus the dimension of input vector is 15*3*2=90. Furthermore, three LSTM layers are used for the main network and an LSTM layer is used for each attention network, each LSTM layer including 100 LSTM neurons. Moreover, the objective function as shown in equation (7) is used, in which the parameters $\lambda_1$, $\lambda_2$, and $\lambda_3$ are set to be 0.001, 0.0001, and 0.0005, respectively.

FIG. 1 illustrates six video frames, in which skeleton representations of two objects are illustrated. At each joint, the spatial attention weight is indicated with the size of the circles. It can be seen that none of the spatial attention weights of joints of the victim is high while the kicker has the largest spatial attention at the left foot, which shows that the model clearly determines the most important or discriminative joint.

Figure 8:
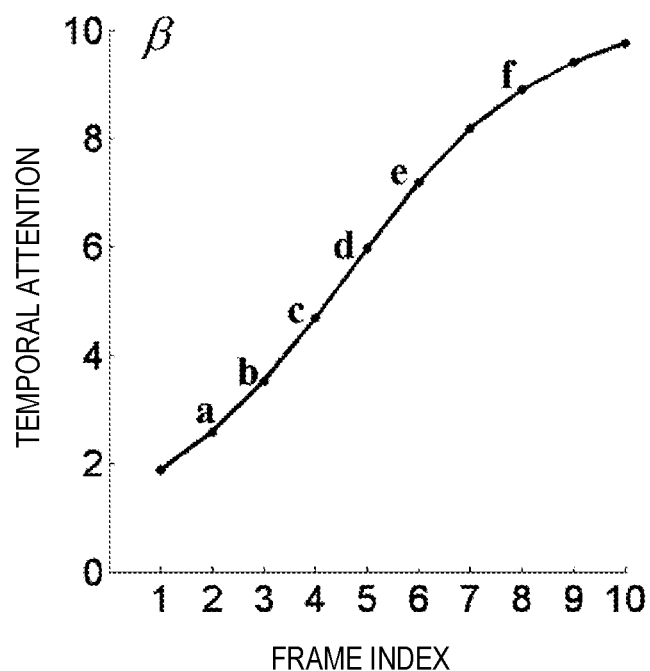
FIG. 8 illustrates a plot of temporal attention weights in accordance with one implementation of the subject matter described herein.
Figure 9:
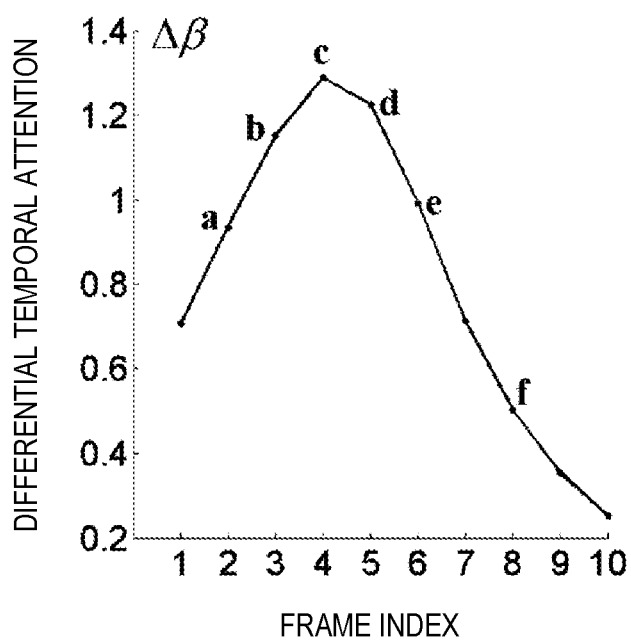
FIG. 9 illustrates a plot of differential temporal attention weights in accordance with the implementation of FIG. 8.

FIGS. 8 and 9 illustrate the temporal attention and differential temporal attention for each frame. As shown, the fourth frame has the highest differential temporal attention. In other words, the fourth frame is the most important or discriminative for action recognition. It can be seen from FIG. 1 that the fourth frame, namely, (d) presents the image in which the left foot of the kicker is raised to the highest and thus is the most discriminative for the action of "kicking."

Figure 10:
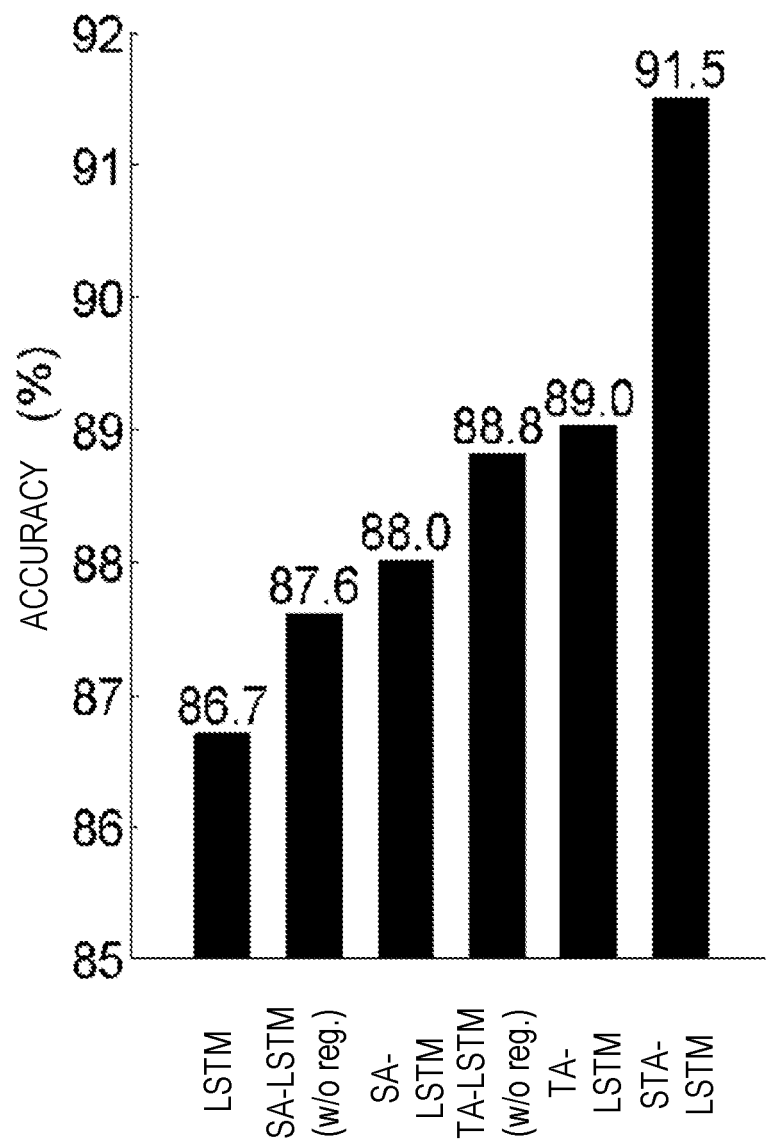
FIG. 10 illustrates a performance comparison diagram of implementations in accordance with the subject matter described herein.

FIG. 10 illustrates performance comparison of one or more implementations in accordance with the subject matter described herein. The horizontal axis represents different models and the vertical axis denotes corresponding accuracy. In FIG. 10, the label "LSTM" represents the main LSTM network without any attention design; the label "SA-LSTM (w/o reg)" represents a model with the main LSTM network and spatial attention sub-network without any regularization and thus involving only the first and fourth terms of equation (7); the label "SA-LSTM" represents a model including the main LSTM network and spatial attention sub-network; the label "TA-LSTM (w/o reg)" represents a model including the main LSTM network and temporal attention sub-network without any regularization and thus involving only the first and fourth terms of equation (7); the label "TA-LSTM" represents a model including the main LSTM network and temporal attention sub-network; STA-LSTM represents a model including the main LSTM network and spatial temporal attention sub-network.

It can be seen that compared with the LSTM scheme, either spatial attention sub-network or temporal attention sub-network may be introduced to improve the accuracy and when both the spatial and temporal attention sub-networks are introduced, the accuracy can be significantly improved. Meanwhile, by introducing two respective regularization terms into the objective function, the accuracy of the model can also be improved.

Example Device

Figure 11:
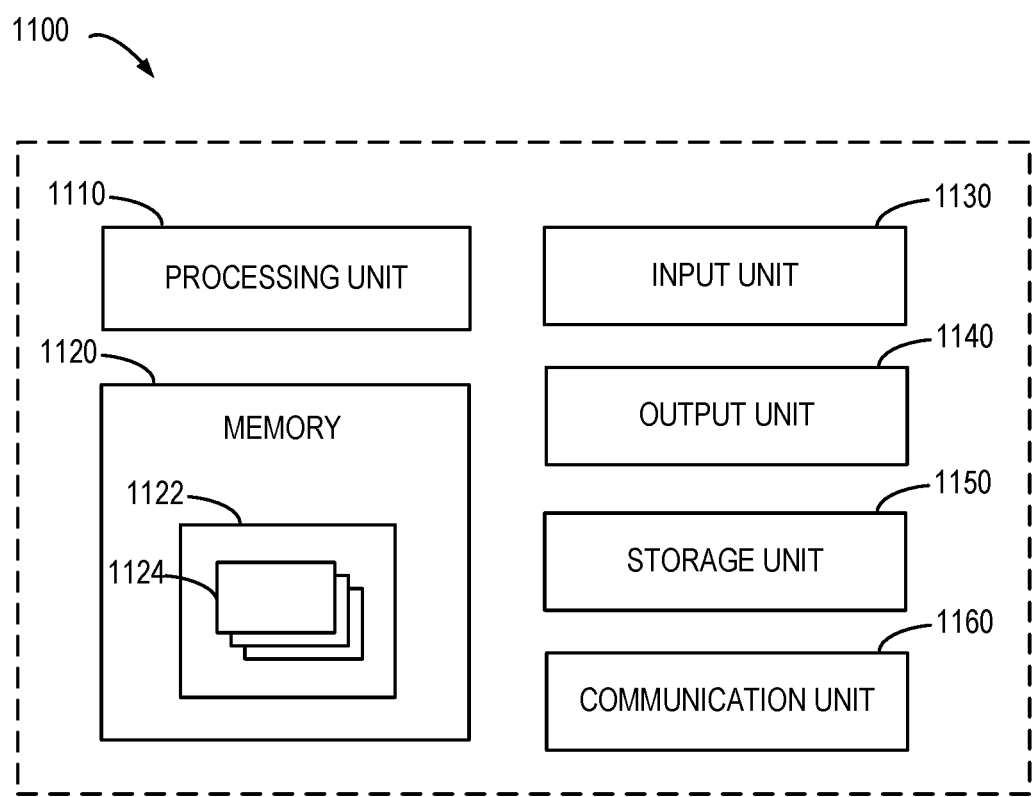
FIG. 11 illustrates a block diagram of an example computing system/server in which one or more implementations of the subject matter described herein may be implemented.

FIG. 11 shows a block diagram of an example computing system/server 1100 in which one or more implementations of the subject matter described herein may be implemented. The model estimating system 110, the model executing system 120, or both of them may be implemented by the computing system/server 1100. The computing system/server 1100 as shown in FIG. 11 is only an example, which should not be constructed as any limitation to the function and scope of use of the implementations described herein.

As shown in FIG. 11, the computing system/server 1100 is in a form of a general-purpose computing device. Components of the computing system/server 1100 may include, but are not limited to, one or more processors or processing units 1110, a memory 1120, one or more input devices 1130, one or more output devices 1140, storage 1150, and one or more communication units 1160. The processing unit 1110 may be a real or a virtual processor and is capable of performing various processes in accordance with a program stored in the memory 1120. In a multi-processing system, multiple processing units execute computer-executable instructions to increase processing power.

The computing system/server 1100 typically includes a variety of machine readable medium. Such medium may be any available medium that is accessible by the computing system/server 1100, including volatile and non-volatile medium, removable and non-removable medium. The memory 1120 may be volatile memory (e.g., registers, cache, a random-access memory (RAM)), non-volatile memory (e.g., a read only memory (ROM), an electrically erasable programmable read only memory (EEPROM), a flash memory), or some combination thereof. The storage 1150 may be removable or non-removable, and may include machine readable medium such as flash drives, magnetic disks or any other medium which can be used to store information and which can be accessed within the computing system/server 1100.

The computing system/server 1100 may further include other removable/non-removable, volatile/non-volatile computing system storage medium. Although not shown in FIG. 11, a disk driver for reading from or writing to a removable, non-volatile disk (e.g., a "floppy disk"), and an optical disk driver for reading from or writing to a removable, non-volatile optical disk can be provided. In these cases, each driver can be connected to the bus 18 by one or more data medium interfaces. The memory 1120 may include at least one program product having a set (e.g., at least one) of program modules that are configured to carry out the functions of various implementations described herein.

A program/utility tool 1122 having a set (at least one) of the program modules 1124 may be stored in, for example, the memory 1120. Such program modules 1124 include, but are not limited to, an operating system, one or more applications, other program modules, and program data. Each or a certain combination of these examples may include an implementation of a networking environment. The program modules 1124 generally carry out the functions and/or methodologies of implementations of the subject matter described herein, for example, the method 900 and/or the method 1000.

The input unit(s) 1130 may be one or more of various different input devices. For example, the input unit(s) 1139 may include a user device such as a mouse, keyboard, trackball, etc. The communication unit(s) 1160 enables communication over communication medium to another computing entity. Additionally, functionality of the components of the computing system/server 1100 may be implemented in a single computing machine or in multiple computing machines that are able to communicate over communication connections. Thus, the computing system/server 1100 may operate in a networked environment using logical connections to one or more other servers, network personal computers (PCs), or another common network node. By way of example, and not limitation, communication media include wired or wireless networking techniques.

The computing system/server 1100 may also communicate, as required, with one or more external devices (not shown) such as a storage device, a display device, and the like, one or more devices that enable a user to interact with the computing system/server 1100, and/or any device (e.g., network card, a modem, etc.) that enables the computing system/server 1100 to communicate with one or more other computing devices. Such communication may be performed via an input/output (I/O) interface(s) (not shown).

The functionally described herein can be performed, at least in part, by one or more hardware logic components. For example, and without limitation, illustrative types of hardware logic components that can be used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

The functionally described herein can be performed, at least in part, by one or more hardware logic components. For example, and without limitation, illustrative types of hardware logic components that can be used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Program code for carrying out methods of the subject matter described herein may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of this disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may include but is not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular implementations. Certain features that are described in the context of separate implementations may also be implemented in combination in a single implementation. Conversely, various features that are described in the context of a single implementation may also be implemented in multiple implementations separately or in any suitable sub-combination.

Example Implementations

Some implementations of the subject matter described herein are listed below.

In some implementations, there is provided a device, comprising: a processing unit; and a memory coupled to the processing unit and storing instructions thereon, the instructions, when executed by the processing unit, causing the device to perform acts including: obtaining representation information of a plurality of frames of a video and a predefined action label for the video, the representation information representing an entity in the plurality of frames and the predefined action label being associated with an action of the entity; and updating a learning network based on the representation information of the plurality of frames and the predefined action label, the learning network including a first sub-network, updating the learning network comprising: causing the first sub-network to determine importance of the plurality of frames based on the representation information, and causing the learning network to determine a probability of the video being associated with the predefined action label based on the representation information and the importance of the plurality of frames.

In some implementations, the acts further include: causing the first sub-network to receive the representation information for a first frame and a second frame preceding the first frame among the plurality of frames and to determine the importance of the first frame based on a non-linear function.

In some implementations, the learning network further comprises a second sub-network, the acts further including: causing the second sub-network to determine the importance of a plurality of predefined portions or a plurality of predefined points of interest in the plurality of frames based on the representation information.

In some implementations, the acts further include: causing the second sub-network to receive the representation information for a first frame and a second frame preceding the first frame among the plurality of frames and to determine the importance of the plurality of predefined portions or the plurality of predefined points of interest in the first frame based on a non-linear function.

In some implementations, updating the learning network comprises: updating the learning network to minimize an objective quantity based on the probability for the action label output by the learning network and the importance determined by the first sub-network, the objective quantity limiting an increase of a value of the importance determined by the first sub-network.

In some implementations, updating the learning network comprises: updating the learning network to minimize an objective quantity based on the probability for the action label output by the learning network and the importance determined by the second sub-network, the objective quantity facilitating the importance determined by the second sub-network to be distributed evenly in the plurality of portions or the plurality of points of interest in the plurality of frames.

In some implementations, the learning network includes a main network, an input of the main network being coupled with an output of the second sub-network and an output of the main network being coupled with an output of the first sub-network, and updating the learning network comprising: with parameters of a first type of sub-network among the first and second sub-networks being fixed, updating parameters of a second type of sub-network among the first and second sub-networks and parameters of the main network, the first type being different from the second type; with the parameters of the second type of sub-network among the first and second sub-networks being fixed, updating the parameters of the first type of sub-network among the first and second sub-networks and the parameters of the main network; with the parameters of the first sub-network and the second sub-network being fixed, updating the parameters of the main network; and jointly updating the parameters of the learning network.

In some implementations, updating parameters of a second type of sub-network among the first and second sub-networks and parameters of the main network comprises: with the parameters of the first type of sub-network among the first and second sub-networks being fixed, updating the parameters of the second type of sub-network and the parameters of a simplified main network; with the updated parameters of the second type of sub-network being fixed, updating the parameters of the main network; and jointly updating the parameters of the second type of sub-network and the main network.

In some implementations, updating parameters of the first type of sub-network among the first and second sub-networks and parameters of the main network comprises: with the parameters of the second type of sub-network among the first and second sub-networks being fixed, updating the parameters of the first type of sub-network and the parameters of a simplified main network; with the updated parameters of the first type of sub-network being fixed, updating the parameters of the main network; and jointly updating the parameters of the first type of sub-network and the main network.

In some implementations, the learning network includes a RNN unit, in particular, an LSTM unit.

In some implementations, the representation information comprises a skeleton representation associated with the entity. The acts include causing the second sub-network to determine, based on a skeleton representation associated with the entity in the plurality of frames, the importance of a plurality of predefined joints in the plurality of frames.

In some implementations, there is provided a device, comprising a processing unit and a memory coupled to the processing unit and storing instructions thereon, the instructions, when executed by the processing unit, causing the device to perform acts including: obtaining representation information of a plurality of frames of a video, the representation information representing an entity in the plurality of frames; and causing the learning network to determine a probability of the video being associated with a predefined action label based on the representation information, the predefined action label being associated with an action of the entity and the learning network including a first sub-network, the determining the probability of the video being associated with the predefined action label comprising causing the first sub-network to determine importance of the plurality of frames based on the representation information.

In some implementations, the learning network further includes a second sub-network, the acts further including: causing the second sub-network to determine the importance of a plurality of portions or a plurality of points of interest in the plurality of frames based on the representation information.

In some implementations, the acts further include: causing the first sub-network to receive the representation information for a first frame and a second frame preceding the first frame among the plurality of frames and to determine the importance of the first frame based on a non-linear function.

In some implementations, the action further include: causing the second sub-network to receive the representation information for a first frame and a second frame preceding the first frame among the plurality of frames, and to determine the importance of a plurality of predefined portions or a plurality of predefined points of interest in the first frame based on a non-linear function.

In some implementations, the learning network includes a RNN unit, in particular a long short-term memory (LSTM) unit.

In some implementations, the representation information comprises a skeleton representation associated with the entity. The acts further include causing the second sub-network to determine, based on a skeleton representation associated with the entity in the plurality of frames, the importance of a plurality of predefined joints in the plurality of frames.

In some implementations, there is provided a method, comprising: obtaining representation information of a plurality of frames of a video and a predefined action label for the video, the representation information representing an entity in the plurality of frames and the predefined action label being associated with an action of the entity; and updating a learning network based on the representation information of the plurality of frames and the predefined action label, the learning network including a first sub-network, updating the learning network comprising: causing the first sub-network to determine importance of the plurality of frames based on the representation information, and causing the learning network to determine a probability of the video being associated with the predefined action label based on the representation information and the importance of the plurality of frames.

In some implementations, the method further comprises: causing the first sub-network to receive the representation information for a first frame and a second frame preceding the first frame among the plurality of frames and to determine the importance of the first frame based on a non-linear function.

In some implementations, the learning network further comprises a second sub-network and the method further comprises: causing the second sub-network to determine the importance of a plurality of predefined portions or a plurality of predefined points of interest in the plurality of frames based on the representation information.

In some implementations, the method further comprises: causing the second sub-network to receive the representation information for a first frame and a second frame preceding the first frame among the plurality of frames and to determine the importance of the plurality of predefined portions or the plurality of predefined points of interest in the first frame based on a non-linear function.

In some implementations, updating the learning network comprises: updating the learning network to minimize an objective quantity based on the probability for the action label output by the learning network and the importance determined by the first sub-network, the objective quantity limiting an increase of a value of the importance determined by the first sub-network.

In some implementations, updating the learning network comprises: updating the learning network to minimize an objective quantity based on the probability for the action label output by the learning network and the importance determined by the second sub-network, the objective quantity facilitating the importance determined by the second sub-network to be distributed evenly in the plurality of portions or the plurality of points of interest in the plurality of frames.

In some implementations, the learning network includes a main network, an input of the main network being coupled with an output of the second sub-network and an output of the main network being coupled with an output of the first sub-network, and updating the learning network comprising: with parameters of a first type of sub-network among the first and second sub-networks being fixed, updating parameters of a second type of sub-network among the first and second sub-networks and parameters of the main network, the first type being different from the second type; with the parameters of the second type of sub-network among the first and second sub-networks being fixed, updating the parameters of the first type of sub-network among the first and second sub-networks and the parameters of the main network; with the parameters of the first sub-network and the second sub-network being fixed, updating the parameters of the main network; and jointly updating the parameters of the learning network.

In some implementations, updating parameters of a second type of sub-network among the first and second sub-networks and parameters of the main network comprises: with the parameters of the first type of sub-network among the first and second sub-networks being fixed, updating the parameters of the second type of sub-network and the parameters of a simplified main network; with the updated parameters of the second type of sub-network being fixed, updating the parameters of the main network; and jointly updating the parameters of the second type of sub-network and the main network.

In some implementations, updating parameters of the first type of sub-network among the first and second sub-networks and parameters of the main network comprises: with the parameters of the second type of sub-network among the first and second sub-networks being fixed, updating the parameters of the first type of sub-network and the parameters of a simplified main network; with the updated parameters of the first type of sub-network being fixed, updating the parameters of the main network; and jointly updating the parameters of the first type of sub-network and the main network.

In some implementations, the learning network includes a RNN unit, in particular, an LSTM unit.

In some implementations, the representation information comprises a skeleton representation associated with the entity. The method further comprises causing the second sub-network to determine, based on a skeleton representation associated with the entity in the plurality of frames, the importance of a plurality of predefined joints in the plurality of frames.

In some implementations, there is provided a method, comprising: obtaining representation information of a plurality of frames of a video, the representation information representing an entity in the plurality of frames; and causing the learning network to determine a probability of the video being associated with a predefined action label based on the representation information, the predefined action label being associated with an action of the entity and the learning network including a first sub-network, the determining the probability of the video being associated with the predefined action label comprising causing the first sub-network to determine importance of the plurality of frames based on the representation information.

In some implementations, the learning network further includes a second sub-network. The method further comprises: causing the second sub-network to determine the importance of a plurality of portions or a plurality of points of interest in the plurality of frames based on the representation information.

In some implementations, the method further comprises: causing the first sub-network to receive the representation information for a first frame and a second frame preceding the first frame among the plurality of frames and to determine the importance of the first frame based on a non-linear function.

In some implementations, the method further comprises: causing the second sub-network to receive the representation information for a first frame and a second frame preceding the first frame among the plurality of frames, and to determine the importance of a plurality of predefined portions or a plurality of predefined points of interest in the first frame based on a non-linear function.

In some implementations, the learning network includes a RNN unit, in particular a long short-term memory (LSTM) unit.

In some implementations, the representation information comprises a skeleton representation associated with the entity. The method further comprises causing the second sub-network to determine, based on a skeleton representation associated with the entity in the plurality of frames, the importance of a plurality of predefined joints in the plurality of frames.

Although the subject matter has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

The invention claimed is:

1. A device comprising:
a processing unit; and
a memory coupled to the processing unit and storing instructions thereon, the instructions, when executed by the processing unit, causing the device to perform acts including:
obtaining representation information of a plurality of frames of a video and a predefined action label for the video, the representation information representing an entity in the plurality of frames and the predefined action label being associated with an action of the entity; and
updating a learning network based on the representation information of the plurality of frames and the predefined action label, the learning network including a first sub-network,
updating the learning network comprising:
causing the first sub-network to determine importance of the plurality of frames based on the representation information, and
causing the learning network to determine a probability of the video being associated with the predefined action label based on the representation information and the importance of the plurality of frames.

2. The device of claim 1, wherein the acts further include:
causing the first sub-network to receive the representation information for a first frame and a second frame preceding the first frame among the plurality of frames and to determine the importance of the first frame based on a non-linear function.

3. The device of claim 1, wherein the learning network further comprises a second sub-network, the acts further including:
causing the second sub-network to determine the importance of a plurality of predefined portions or a plurality of predefined points of interest in the plurality of frames based on the representation information.

4. The device of claim 3, wherein the acts further include:
causing the second sub-network to receive the representation information for a first frame and a second frame preceding the first frame among the plurality of frames and to determine the importance of the plurality of predefined portions or the plurality of predefined points of interest in the first frame based on a non-linear function.

5. The device of claim 1, wherein updating the learning network comprises:
updating the learning network to minimize an objective quantity based on the probability for the predefined action label output by the learning network and the importance determined by the first sub-network, the objective quantity limiting an increase of a value of the importance determined by the first sub-network.

6. The device of claim 3, wherein updating the learning network comprises:
updating the learning network to minimize an objective quantity based on the probability for the predefined action label output by the learning network and the importance determined by the second sub-network, the objective quantity facilitating the importance determined by the second sub-network to be distributed evenly in the plurality of predefined portions or the plurality of predefined points of interest in the plurality of frames.

7. The device of claim 3, wherein the learning network includes a main network, an input of the main network being coupled with an output of the second sub-network and an output of the main network being coupled with an output of the first sub-network, and updating the learning network comprising:
with parameters of a first type of sub-network among the first and second sub-networks being fixed, updating parameters of a second type of sub-network among the first and second sub-networks and parameters of the main network, the first type being different from the second type;
with the parameters of the second type of sub-network among the first and second sub-networks being fixed, updating the parameters of the first type of sub-network among the first and second sub-networks and the parameters of the main network;
with the parameters of the first sub-network and the second sub-network being fixed, updating the parameters of the main network; and
jointly updating the parameters of the learning network.

8. The device of claim 7, wherein updating the parameters of the second type of sub-network among the first and second sub-networks and the parameters of the main network comprises:
with the parameters of the first type of sub-network among the first and second sub-networks being fixed, updating the parameters of the second type of sub-network and parameters of a simplified main network;
with the updated parameters of the second type of sub-network being fixed, updating the parameters of the main network; and
jointly updating the parameters of the second type of sub-network and the main network.

9. The device of claim 1, wherein the learning network includes a long short-term memory (LSTM) unit.

10. The device of claim 3, wherein the acts include:
causing the second sub-network to determine, based on a skeleton representation associated with the entity in the plurality of frames, the importance of a plurality of predefined joints in the plurality of frames.

11. A device comprising:
a processing unit; and
a memory coupled to the processing unit and storing instructions thereon, the instructions, when executed by the processing unit, causing the device to perform acts including:
obtaining representation information of a plurality of frames of a video, the representation information representing an entity in the plurality of frames; and
causing a learning network to determine a probability of the video being associated with a predefined action label based on the representation information, the predefined action label being associated with an action of the entity and the learning network including a first sub-network,
the determining the probability of the video being associated with the predefined action label comprising causing the first sub-network to determine importance of the plurality of frames based on the representation information.

12. The device of claim 11, wherein the learning network further includes a second sub-network, the acts further including:
causing the second sub-network to determine the importance of a plurality of portions or a plurality of points of interest in the plurality of frames based on the representation information.

13. The device of claim 11, wherein the learning network includes a long short-term memory (LSTM) unit.

14. The device of claim 12, wherein the acts further include:
causing the second sub-network to determine, based on a skeleton representation associated with the entity in the plurality of frames, the importance of a plurality of predefined joints in the plurality of frames.

15. A method, comprising:
obtaining representation information of a plurality of frames of a video, the representation information representing an entity in the plurality of frames; and
causing the learning network to determine a probability of the video being associated with a predefined action label based on the representation information, the predefined action label being associated with an action of the entity and the learning network including a first sub-network,
the determining the probability of the video being associated with the predefined action label comprising causing the first sub-network to determine importance of the plurality of frames based on the representation information.

* * * * *